(12) United States Patent
Stannard

(10) Patent No.: US 6,779,738 B1
(45) Date of Patent: Aug. 24, 2004

(54) VEHICLE TRACTION MAT

(76) Inventor: Gregory L. Stannard, 1012 Kings Tree Dr., Mitchellville, MD (US) 20721

( * ) Notice: Subject to any disclaimer, the term of this patent is extended or adjusted under 35 U.S.C. 154(b) by 0 days.

(21) Appl. No.: 10/392,771

(22) Filed: Mar. 20, 2003

(51) Int. Cl.⁷ .............................................. E01B 23/00
(52) U.S. Cl. ........................................................ 238/14
(58) Field of Search ................................ 238/14, 10 R; 291/1, 2

(56) References Cited

U.S. PATENT DOCUMENTS

| | | | | |
|---|---|---|---|---|
| 3,025,002 A | * | 3/1962 | Kunz | 244/7 A |
| 3,836,075 A | * | 9/1974 | Botbol | 238/14 |
| 4,300,722 A | * | 11/1981 | Simmons | 238/14 |
| 4,993,768 A | * | 2/1991 | Ewen | 294/51 |
| 5,486,027 A | * | 1/1996 | Dionne et al. | 294/51 |
| 6,129,289 A | * | 10/2000 | Morin, Jr. | 238/14 |

* cited by examiner

Primary Examiner—S. Joseph Morano
Assistant Examiner—Robert J. McCarry, Jr.

(57) ABSTRACT

A vehicle traction mat for helping dislodge a motor vehicle that is stuck in a rut comprises a plurality of hooks and at least one mat having a top surface and a bottom surface. The mat top surface has a plurality of dimples therein. The mat has a plurality of mat connection holes therethrough. The hooks are disposed within the mat connection holes. The hooks are hingedly connected to the mat. The mat is capable of folding while the hooks are disposed within the mat connection holes. A plurality of spikes are connected to the mat bottom surface.

19 Claims, 3 Drawing Sheets

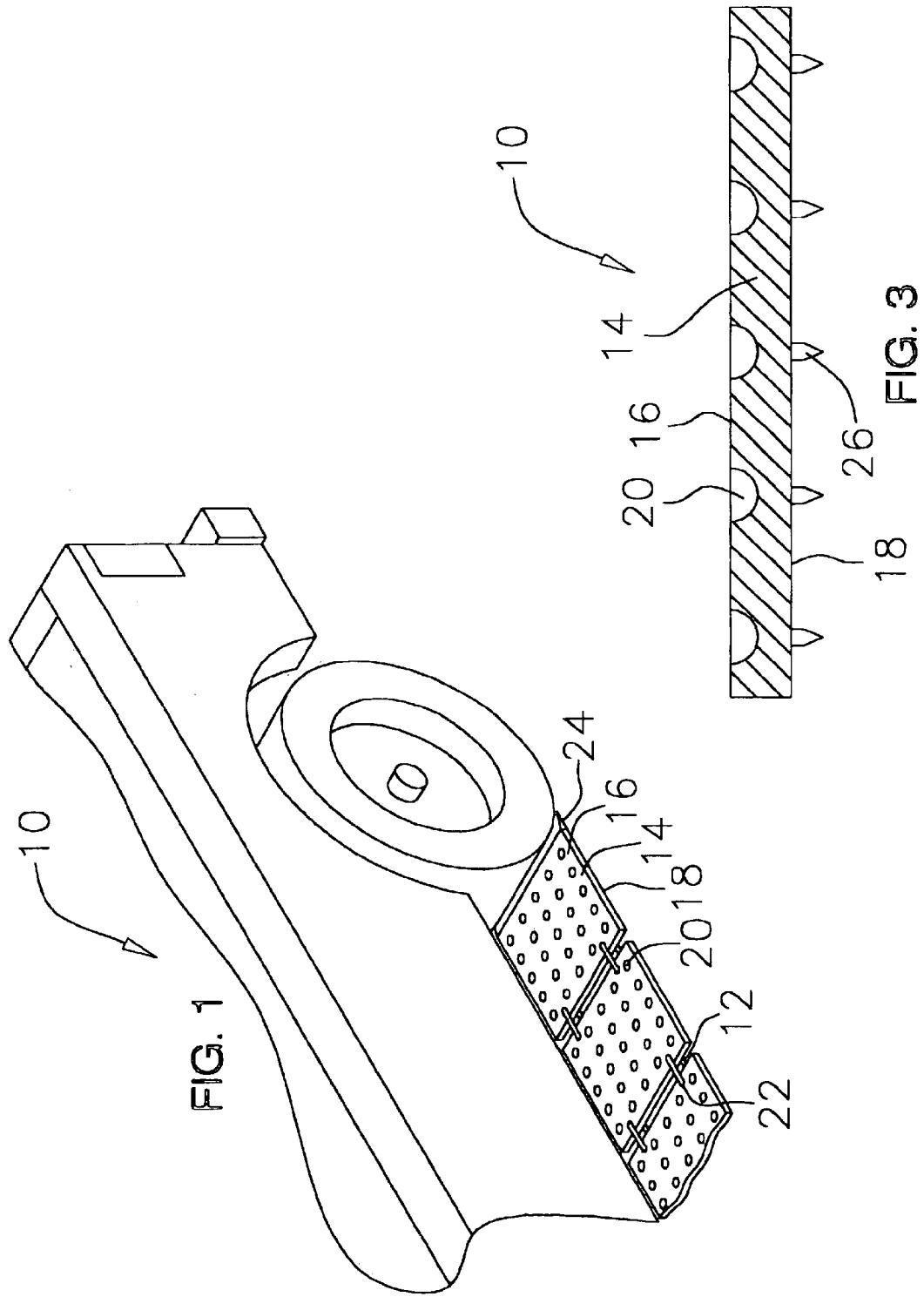

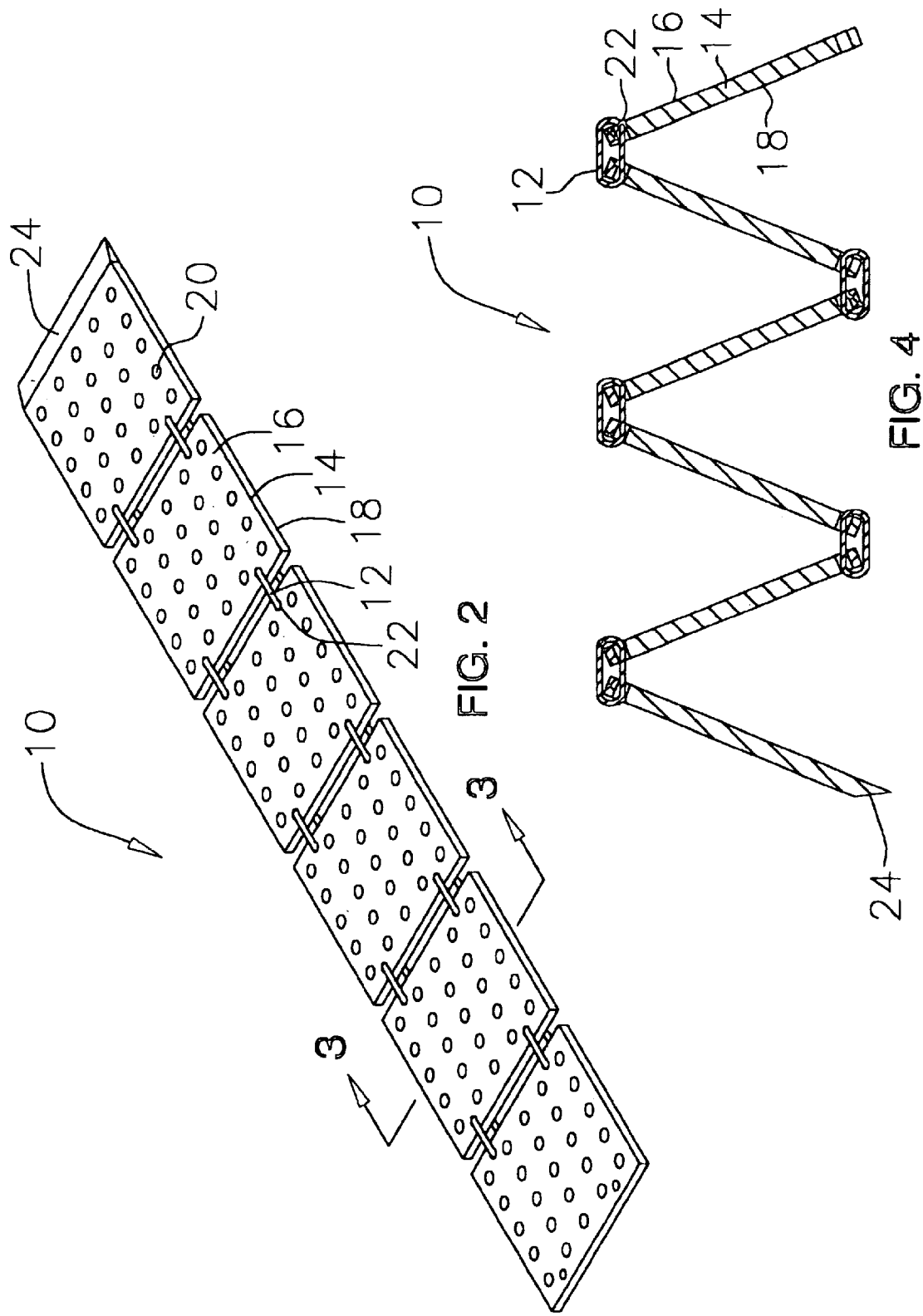

VEHICLE TRACTION MAT

BACKGROUND OF THE INVENTION

1. Field of the Invention

The present invention relates to a vehicle traction mat for use in connection with mats for use under wheels of vehicles. The vehicle traction mat has particular utility in connection with traction mat that is capable of folding while assembled.

2. Description of the Prior Art

Vehicle traction mats are desirable for use to help dislodge a motor vehicle that is stuck in a rut of ice, mud, sand or snow. The device would save the motorist time and effort by enabling a drive wheel to regain traction for return to the roadway. It would also eliminate the high cost of an emergency road service truck for winching the stranded vehicle from a slippery hole or rut. A need was felt for a traction mat that could be folded while assembled.

The use of mats for use under wheels of vehicles is known in the prior art. For example, U.S. Pat. No. 5,439,171 to Fruend discloses a traction mat for vehicles has panels of flexible resilient material interconnected by sets of overlapping links which enable the panels to be folded in a stacked arrangement. Recesses or slots in the upper faces of the panels provide grip for a vehicle's tires and holes in the panel enable the panel to be pushed down through mud to a solid surface. However, the Fruend '171 patent does not have interchangeable hinge-like hooks that may allow the traction mat to be folded while assembled.

Similarly, U.S. Pat. No. 5,538,183 to McGee discloses a vehicle traction mat that consists of a plurality of hinged panels including side rails where the panels on each end are shorter in length than the panels between them. The panel on one end is shorter in length than the panel on the other end. Both end panels are tapered in thickness and in with. The top surface is covered with projects forming rectangular cavities with the top of the long sides higher at the ends than in the mid-section. The bottom surface includes fasteners for removably attaching cleats for gripping slippery surfaces. A variety of cleats are proposed for securing the mat under different conditions. Bracing arms are provided to support the mat in an upright position when it is used as a highway warning marker. The mat is brightly colored for daytime use and the side rails and bracing arms are covered with light reflective material for use during the hours of darkness. The panels are so hinged that one half will fold over the remaining half without interference for storage. However, the McGee '183 patent does not have interchangeable hinge-like hooks that may allow the traction mat to be folded while assembled.

Lastly, U.S. Pat. No. 2,479,760 to Merrick discloses a traction device comprising a rectangular plate curved transversely to provide a concave upper face and convex under face. A series of longitudinal and transverse intersecting ribs formed integral with the upper face of said plate. A series of spaced transverse ribs formed integral with the under face. The lower edges of the last mentioned ribs are disposed in a horizontal plane. However, the Merrick '760 patent does not have interchangeable hinge-like hooks that may allow the traction mat to be folded while assembled.

While the above-described devices fulfill their respective, particular objectives and requirements, the aforementioned patents do not describe a vehicle traction mat that allows traction mat that is capable of folding while assembled. The Fruend '171, McGee '183 and Merrick '760 patents make no provision for interchangeable hinge-like hooks that may allow the traction mat to be folded while assembled.

Therefore, a need exists for a new and improved vehicle traction mat which can be used for traction mat that is capable of folding while assembled. In this regard, the present invention substantially fulfills this need. In this respect, the vehicle traction mat according to the present invention substantially departs from the conventional concepts and designs of the prior art, and in doing so provides an apparatus primarily developed for the purpose of traction mat that is capable of folding while assembled.

SUMMARY OF THE INVENTION

In view of the foregoing disadvantages inherent in the known types of mats for use under wheels of vehicles now present in the prior art, the present invention provides an improved vehicle traction mat, and overcomes the above-mentioned disadvantages and drawbacks of the prior art. As such, the general purpose of the present invention, which will be described subsequently in greater detail, is to provide a new and improved vehicle traction mat and method which has all the advantages of the prior art mentioned heretofore and many novel features that result in a vehicle traction mat which is not anticipated, rendered obvious, suggested, or even implied by the prior art, either alone or in any combination thereof To attain this, the present invention essentially comprises a plurality of hooks and at least one mat having a top surface and a bottom surface. The mat top surface has a plurality of dimples therein. The mat has a plurality of mat connection holes therethrough. The hooks are disposed within the mat connection holes. The hooks are hingedly connected to the mat. The mat is capable of folding while the hooks are disposed within the mat connection holes. A plurality of spikes are connected to the mat bottom surface.

There has thus been outlined, rather broadly, the more important features of the invention in order that the detailed description thereof that follows may be better understood and in order that the present contribution to the art may be better appreciated.

The invention may also include a leading edge bevel, a storage case, a flashlight and a roadside flare. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicle traction mat that has all of the advantages of the prior art mats for use under wheels of vehicles and none of the disadvantages.

It is another object of the present invention to provide a new and improved vehicle traction mat that may be easily and efficiently manufactured and marketed.

An even further object of the present invention is to provide a new and improved vehicle traction mat that has a low cost of manufacture with regard to both materials and labor, and which accordingly is then susceptible of low prices of sale to the consuming public, thereby making such vehicle traction mat economically available to the buying public.

Still another object of the present invention is to provide a new vehicle traction mat that provides in the apparatuses and methods of the prior art some of the advantages thereof, while simultaneously overcoming some of the disadvantages normally associated therewith.

Lastly, it is an object of the present invention is to provide a vehicle traction mat for that has interchangeable hinge-like hooks that allow the traction map to be folded while assembled.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top perspective view of the preferred embodiment of the vehicle traction mat constructed in accordance with the principles of the present invention.

FIG. 2 is a top perspective view of the vehicle traction mat of the present invention.

FIG. 3 is a section 3—3 view of FIG. 2 of the vehicle traction mat of the present invention.

FIG. 4 is a left side view of the vehicle traction mat of the present invention.

The same reference numerals refer to the same parts throughout the various figures.

DESCRIPTION OF THE PREFERRED EMBODIMENT

Figure 5:
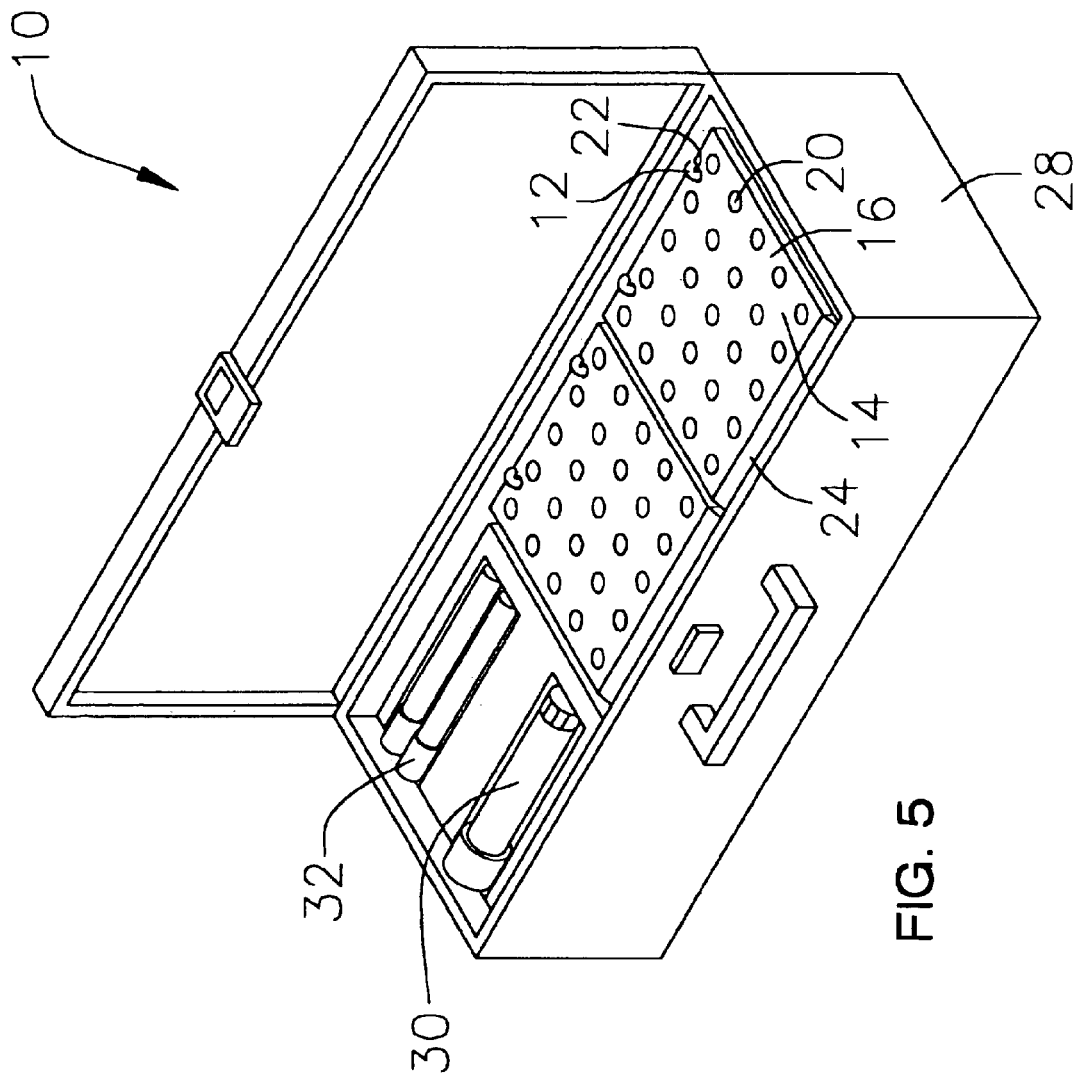
FIG. 5 is a top perspective view of the vehicle traction mat of the present invention.

Referring now to the drawings, and particularly to FIGS. 1–5, a preferred embodiment of the vehicle traction mat of the present invention is shown and generally designated by the reference numeral 10.

In FIG. 1, a new and improved vehicle traction mat 10 of the present invention for traction mat that is capable of folding while assembled is illustrated and will be described. More particularly, the vehicle traction mat 10 has a plurality of interchangeable steel hooks 12 that have substantially the shape of the elongated oval. At least one plastic mat 14 has a top surface 16 and a bottom surface 18. In other embodiments the mat 14 could be comprised of rubber. The mat top surface 16 has a plurality of dimples 20 therein, the dimples 20 are ½ inch deep. The mat 14 has a plurality of mat connection holes 22 therethrough. The hooks 12 are disposed within the mat connection holes 22. The hooks 12 are hingedly connected to the mat 14. In the present example between six and eight mats 14 are connected together by the hooks 12. The mat 14 is capable of folding while the hooks 12 are disposed within the mat connection holes 22. The mats 14 are 12 inches wide by 12 inches long. The mats 14 could be made to different dimensions to accommodate different sizes and types of vehicles. The mat 14 has a leading edge bevel 24. A plurality of spikes 26 are connected to the mat bottom surface 18 (shown in FIG. 3).

In FIG. 2, the vehicle traction mat 10 is illustrated and will be described. More particularly, the vehicle traction mat 10 has the plurality of steel hooks 12 that have substantially the shape of the elongated oval. The plastic mat 14 has the top surface 16 and the bottom surface 18. The mat top surface 16 has the plurality of dimples 20 therein, the dimples 20 are ½ inch deep. The mat 14 has the plurality of mat connection holes 22 therethrough. The hooks 12 are disposed within the mat connection holes 22. The hooks 12 are hingedly connected to the mat 14. The mat 14 is capable of folding while the hooks 12 are disposed within the mat connection holes 22. The mats 14 are 12 inches wide by 12 inches long. The mat 14 has the leading edge bevel 24. The plurality of spikes 26 are connected to the mat bottom surface 18 (shown in FIG. 3).

In FIG. 3, the vehicle traction mat 10 is illustrated and will be described. The plastic mat 14 has the top surface 16 and the bottom surface 18. The mat top surface 16 has the plurality of dimples 20 therein, the dimples 20 are ½ inch deep. The mats 14 are 12 inches wide by 12 inches long. The plurality of spikes 26 are connected to the mat bottom surface 18. The spikes 26 are ¼ inch tall.

In FIG. 4, the vehicle traction mat 10 is illustrated and will be described. More particularly, the vehicle traction mat 10 has the plurality of interchangeable steel hooks 12 that have substantially the shape of the elongated oval. The plastic mat 14 has the top surface 16 and the bottom surface 18. The mat 14 has the plurality of mat connection holes 22 therethrough. The hooks 12 are disposed within the mat connection holes 22. The hooks 12 are hingedly connected to the mat 14. The mat 14 is capable of folding while the hooks 12 are disposed within the mat connection holes 22. The mats 14 are 12 inches wide by 12 inches long. The mat 14 has the leading edge bevel 24.

In FIG. 5, the vehicle traction mat 10 is illustrated and will be described. The mat 14 is capable of folding while the hooks 12 are disposed within the mat connection holes 22. A storage case 28 is capable of storing the mat 14. A flashlight 30 is stored within the storage case 28. A roadside flare 32 is stored within the storage case 28.

In use it can now be seen that when a vehicle becomes stuck in a slippery rut, the motorist would retrieve the traction mat 10 and open it out to full length. It would then be positioned beneath the front of the front drive tire or in front of the rear drive tire. The traction mat 10 wold be positioned longitudinally with the vehicle and shoved beneath the front edge of the rubber tire so immediate traction could be obtained. Upon returning to the vehicle interior and slowly pressing on the accelerator, the rubber tire would contact the series of mats 14 while the spikes 26 dig into the slippery ground surface. The immediate traction created would enable the motorist to drive up and out of the hole until the vehicle returns to the roadway. Once the vehicle is free of the slippery rut, the traction ramp 10 could be retrieved and stored.

While a preferred embodiment of the vehicle traction mat has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as plastic or composite may be used instead of the rubber panels described. And although traction mat that is capable of folding while assembled have been described, it should be appreciated that the vehicle traction mat herein described is also suitable for use as a temporary walkway.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle traction mat comprising:
   a plurality of hooks, said hooks have substantially the shape of an elongated oval;
   at least one mat having a top surface and a bottom surface, said top surface having a plurality of dimples therein, said mat having a plurality of mat connection holes therethrough, said hooks disposed within said mat connection holes, said hooks hingedly connected to said mat, said mat capable of folding while said hooks are disposed within said mat connection holes; and
   a plurality of spikes connected to said mat bottom surface.

2. The vehicle traction mat of claim 1 wherein:
   said mat having a leading edge bevel.

3. The vehicle traction mat of claim 1 wherein:
   said mats are 12 inches wide by 12 inches long.

4. The vehicle traction mat of claim 1 wherein:
   said mats are comprised of rubber.

5. The vehicle traction mat of claim 1 wherein:
   said mats are comprised of plastic.

6. The vehicle traction mat of claim 1 wherein:
   said hooks are comprised of steel.

7. The vehicle traction mat of claim 1 wherein:
   said spikes are ¼ inch tall.

8. The vehicle traction mat of claim 1 wherein:
   said dimples are ½ inch deep.

9. The vehicle traction mat of claim 1 further comprising:
   a storage case capable of storing said mat.

10. The vehicle traction mat of claim 9 further comprising:
    a flashlight stored within said storage case.

11. The vehicle traction mat of claim 9 further comprising:
    a roadside flare stored within said storage case.

12. A vehicle traction mat comprising:
    a plurality of steel hooks, said hooks have substantially the shape of an elongated oval;
    at least one plastic mat having a top surface and a bottom surface, said top surface having a plurality of dimples therein, said mat having a plurality of mat connection holes therethrough, said hooks disposed within said mat connection holes, said hooks hingedly connected to said mat, said mat capable of folding while said hooks arc disposed within said mat connection holes; and
    a plurality of spikes connected to said mat bottom surface.

13. The vehicle traction mat of claim 12 wherein:
    said mat having a leading edge bevel.

14. The vehicle traction mat of claim 13 wherein:
    said mats are 12 inches wide by 12 inches long.

15. The vehicle traction mat of claim 14 wherein:
    said spikes are ¼ inch tall.

16. The vehicle traction mat of claim 15 wherein:
    said dimples are ½ inch deep.

17. The vehicle traction mat of claim 15 further comprising:
    a storage case capable of storing said mat.

18. The vehicle traction mat of claim 17 further comprising:
    a flashlight stored within said storage case; and
    a roadside flare stored within said storage case.

19. A vehicle traction mat comprising:
    a plurality of steel hooks, said hooks have substantially the shape of an elongated oval;
    at least one plastic mat having a top surface and a bottom surface, said top surface having a plurality of dimples therein said dimples are ½ inch deep, said mat having a plurality of mat connection holes therethrough, said hooks disposed within said mat connection holes, said hooks hingedly connected to said mat, said mat capable of folding while said hooks are disposed within said mat connection holes, said mats are 12 inches wide by 12 inches long, said mat having a leading edge bevel;
    a plurality of spikes connected to said mat bottom surface, said spikes are ¼ inch tall;
    a storage case capable of storing said mat;
    a flashlight stored within said storage case; and
    a roadside flare stored within said storage case.

* * * * *